United States Patent [19]

Hodgetts

[11] Patent Number: 4,653,289

[45] Date of Patent: Mar. 31, 1987

[54] VENTILATOR-MOUNTED RECEPTACLE AND MOUNTING MEANS THEREFOR

[76] Inventor: Graham L. Hodgetts, Box 591, R.D. #7, Mars, Pa. 16046

[21] Appl. No.: 758,295

[22] Filed: Jul. 24, 1985

[51] Int. Cl.⁴ .............................................. B60H 1/32
[52] U.S. Cl. ...................................... 62/239; 62/244; 62/371; 62/377
[58] Field of Search ................ 62/377, 239, 240, 293, 62/371, 377

[56] References Cited

U.S. PATENT DOCUMENTS

| | | | |
|---|---|---|---|
| 3,410,337 | 11/1968 | Priest | 165/41 |
| 3,505,830 | 4/1970 | Koerner | 62/337 |
| 3,757,851 | 9/1973 | Marble | 165/41 |
| 3,850,006 | 11/1974 | Redfern et al. | 62/216 |
| 3,858,405 | 1/1975 | Manzke | 62/196 |
| 3,916,639 | 11/1975 | Atkinson | 62/239 |
| 4,022,599 | 5/1977 | Wilson et al. | 62/244 |
| 4,103,510 | 8/1978 | Hall | 62/299 |
| 4,258,555 | 3/1981 | Scharm et al. | 62/244 |
| 4,368,622 | 1/1983 | Brooks | 62/377 X |
| 4,478,052 | 10/1984 | McDowell | 62/244 |

*Primary Examiner*—Lloyd L. King
*Attorney, Agent, or Firm*—Webb, Burden, Robinson & Webb

[57] ABSTRACT

A ventilator-mounted receptacle having a body including a base and a plurality of upstanding wall sections joined to the base and to adjacent edges extending from the base to define a chamber which houses an upright container for holding food, drink or the like. The receptacle is supported by a ventilator cover, cover nozzle and rigid receiver adjacent an air conditioner ventilator, particularly in a vehicle and conditioned air from the ventilator is introduced to the chamber through the cover nozzle and the receiver. The ventilator cover may be mounted on a ventilator by at least one threaded mounting bolt and nut, the mounting bolt extending through a mounting aperture in the ventilator cover, and either clamped or tied to a louver of the ventilator.

7 Claims, 8 Drawing Figures

VENTILATOR-MOUNTED RECEPTACLE AND MOUNTING MEANS THEREFOR

BACKGROUND OF THE INVENTION

1. Field of the Invention

This invention relates to a receptacle for cooling and heating food, drink and the like by means of the air flow from a ventilator of an air conditioner. More specifically, the invention relates to a receptacle which is supported directly adjacent the ventilator so that the contents of the receptacle and a container held upright in the receptacle can be cooled or heated by the air flow from the ventilator of an air conditioner, particularly in a vehicle, such as an automobile, truck or the like. The invention is also useful in connection with the ventilator of a stationary air conditioner such as a window-mounted unit.

2. Description of the Prior Art

Typically, a stationary or motor vehicle air conditioner includes an outlet or ventilator from which cooled or heated air flows into a room or passenger compartment. In a vehicle, the ventilators are usually positioned in the dashboard to provide better air flow into the compartment and to facilitate driver and passenger control of the louvers usually found in each ventilator for directing the air within the compartment.

It is commonly known that vehicle air conditioners can be used to cool receptacles which are remotely connected to the air conditioners. In some instances, the cooling receptacle is integrated into the system so that the refrigerant of the system is additionally conveyed through the cooling receptacle. Exemplary of such devices are those disclosed in U.S. Pat. Nos. 3,850,006, 3,858,405 and 4,103,510.

In other instances, the cooling receptacle is connected by conduits or hosing to the ductwork leading from the air conditioner to the ventilators in the passenger compartment. Such a device is disclosed in U.S. Pat. No. 3,757,851.

It is further known that food, drink or the like can be cooled or heated when placed in a receptacle remotely attached to the ventilator of a vehicle air conditioner. U.S. Pat. Nos. 3,410,337, 3,505,830 and 3,916,639 show such devices. These devices employ several means by which to support the receptacle within various areas of the passenger compartment. In U.S. Pat. No. 3,410,337, for example, the receptacle is intended to rest on the front seat between driver and passenger in order to further serve as an arm rest. U.S. Pat. No. 3,505,830 teaches alternative placement of the receptacle on either the front passenger seat or on the floor behind the front seat. Finally, the receptacle of U.S. Pat. No. 3,916,639 is provided with adjustable, slidably mounted legs so that the receptacle can be positioned over the vehicle transmission hump beneath a centrally located ventilator.

Each of the aforementioned receptacles requires a lengthy conduit for connecting the receptacle to a ventilator. Furthermore, each receptacle is supported a distance from the ventilator. This necessitates that some sort of flexible hosing be used. Such hosing can be easily punctured or readily dislodged by the occupants of the passenger compartment. In addition, the hosing and remotely supported receptacle occupy valuable space within the passenger compartment. In some instances, an entire passenger seat is devoted to the receptacle.

These prior devices do not efficiently cool their contents for several reasons. Because lengthy hosing is needed, energy is wasted cooling or heating the conduit means. Also, if only a few, small items such as beverage cans required some sort of temperature modification, the entire receptacle had to be cooled or heated. Once the contents of the receptacle reached a desired temperature, prior devices required that the temperature be maintained uniformly for all items within. There was no means for the driver or an individual passenger to control the temperature at which their personal food, drink or the like was being maintained.

SUMMARY OF THE INVENTION

This invention relates to a ventilator-mounted receptacle and means for mounting the receptacle onto an air conditioner ventilator. In a preferred embodiment, the receptacle comprises a body including a base and a plurality of upstanding wall sections attached to said base and joined on adjacent edges extending from said base to define a chamber, and a means for rigidly supporting said body directly adjacent a ventilator and for introducing conditioned air to said chamber which houses an open or closed container in an upright position. The means for supporting said body and introducing conditioned air to said chamber preferably comprises a ventilator cover, a cover nozzle protruding from the surface of said ventilator cover and a rigid receiver, said cover nozzle being adapted for connection to said receiver. Most preferably, said receiver is in the form of a receiver nozzle, adapted for connection to said cover nozzle.

The receptacle may have a conditioned air exhaust hole extending through one of the wall sections opposed to said receiver nozzle or through the base of the chamber. Cooled air may exit the receptacle through the exhaust hole after circulating the chamber. Additionally, the receptacle may include a lid including a top portion and a plurality of lid side sections joined to said top portion and to adjacent edges extending from said top portion. The side sections are sized and shaped to surround and overlap the wall sections of the body by a variable amount. The side sections preferably have a plurality of apertures each of which defines a lid air exhaust hole that varies in size depending upon the amount the side sections overlap the wall sections when the lid is placed on the body.

The receptacle of this invention may also include a plurality of container supports mounted on the base of the body. Alternatively, the supports may be mounted on the wall sections near the base. The supports allow for conditioned air to flow beneath a container, such as a beverage can, resting on the supports.

The ventilator cover of the invention comprises a substantially planar member having a surface from which a cover nozzle protrudes and an extension. The extension is provided on the planar member of the ventilator cover to accommodate ventilators of various sizes.

The ventilator cover can be clamped on or tied around a louver of a ventilator. One form of mounting means includes at least one mounting aperture extending through the ventilator cover; an L-shaped clamping plate; a threaded mounting bolt and nut; and a J-shaped member having an inwardly threaded end for attachment to an end of the mounting bolt. The J-shaped member and L-shaped clamping plate are positioned about the edges of a louver and closed by tightening the nut onto the mounting bolt from outside the ventilator cover.

An alternative mounting means of the invention comprises at least one mounting aperture extending through the ventilator cover; a tie strap for surrounding a louver of the ventilator; a tie strap boss; and a threaded mounting bolt and nut, said mounting bolt extending through an aperture in the boss and through the mounting aperture in the ventilator cover.

The invention does not require lengthy hosing or conduit since the cover nozzle protruding from the ventilator cover supports the receptacle directly adjacent the ventilator. By the short coupling of the cover nozzle to the rigid receiver, the contents of the receptacle can be cooled or heated efficiently. With the receptacle positioned near the vehicle air conditioner ventilator, movement within the passenger compartment is less restricted. No passenger seat or leg room is forfeited to the ventilator-mounted receptacle. Because the invention occupies minimal space around the dashboard, separate receptacles can be attached to multiple ventilators. This will permit individual occupants of the vehicle to maintain the contents of their personal receptacles at varying temperatures.

It is not necessary that a container, such as a beverage can, be removed from the receptacle for drinking. The body of the receptacle and its contents can be easily and repeatedly connected to the cover nozzle, which protrudes from a ventilator cover mounted to a ventilator.

In addition to the aforementioned advantages, the invention is relatively inexpensive to make and requires very few parts. The ventilator-mounted receptacle is adapted for mounting on every size and shape of vehicle ventilator, including circularly-shaped air conditioner ventilators. The major components of the invention can be made from metal materials. Alternatively, the receptacle and ventilator cover can be molded from well-known plastics.

Although the invention will be described with reference to the cooling of food, drink or the like from the conditioned air of a vehicle ventilator, it is evident and it is to be understood that the invention is applicable to both cooling and heating of the contents within the receptacle. The invention has many applications. It can also be mounted adjacent the ventilator of a stationary air conditioner such as a window-mounted unit.

DESCRIPTION OF THE PREFERRED EMBODIMENTS

Figure 1:
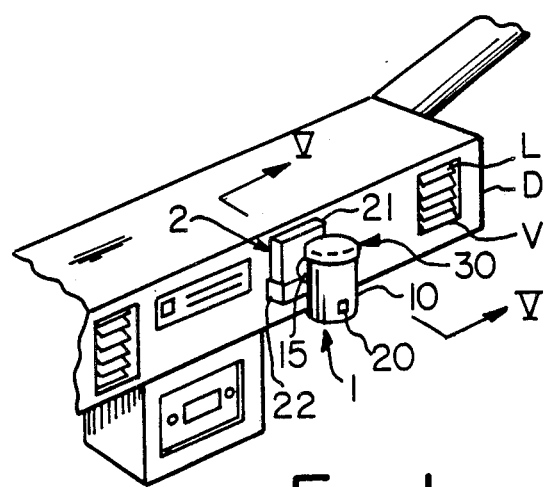
FIG. 1 is a perspective view of the receptacle, lid and ventilator cover mounted on a ventilator in the dashboard of a vehicle.
Figure 2:
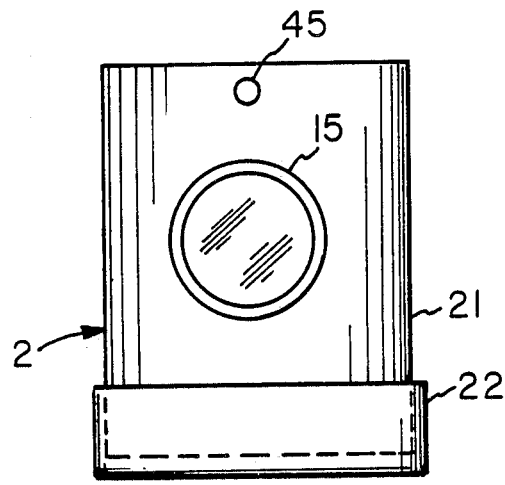
FIG. 2 is a front view of a ventilator cover.

Referring to FIGS. 1-4, the receptacle 1 is shown mounted on a conventional vehicle air conditioner ventilator. The ventilator cover 2 of the receptacle 1 completely covers and hides from view the ventilator to which it is mounted. However, the ventilator is similar to ventilator V shown in the dashboard D of an automobile, truck or the like. The ventilator V may have movable louvers L for directing the flow of conditioned air within the passenger compartment. The receptacle 1 may also cover a circularly-shaped ventilator as found in the dashboards of some vehicles.

The ventilator-mounted receptacle 1 comprises a cylindrical body 10 including a base 11 and a plurality of curved wall sections 12 joined to the base and to adjacent edges extending from the base. The body 10 forms a chamber for the storage of food, drink or the like. Alternatively, the body may have a polygonal cross-section formed by straight wall sections joined along their vertical edges.

The body 10 is supported directly adjacent the ventilator by a cover nozzle 15 protruding from a surface of the ventilator cover 2. The cover nozzle 15 is adapted for connection to a rigid receiver in the body 10. Preferably, the receiver is in the form of a receiver nozzle 16. Both the cover nozzle 15 and receiver nozzle 16 are hollow, circular cylinders which allow conditioned air to flow from the ventilator into the chamber of the receptacle 1. The receiver nozzle 16 of the body 10 is frictionally engaged with the cover nozzle 15 for easy and repeated connection to the cover nozzle 15. It is not necessary that an opened, upright container C placed in body 10 be removed from the receptacle 1 each time for drinking purposes.

Figure 3:
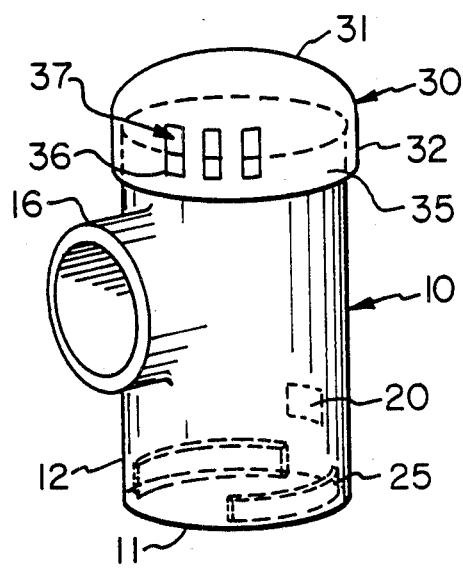
FIG. 3 is a perspective view of the body of the receptacle and lid.

In FIG. 3, a conditioned air exhaust hole 20 is provided in a wall section of the body 10 opposite the receiver nozzle 16. Alternatively, the exhaust hole 20 may extend through the base 11 of the body 10, as in FIG. 4. The exhaust hole 20 allows conditioned air to exit the receptacle 1 after circulating the chamber and conditioning its contents.

The ventilator cover 2 serves to support the body 10 of the receptacle 1 adjacent an air conditioner ventilator and directs the conditioned air from said ventilator through the cover nozzle 15 into the chamber of the receptacle 1. The receptacle 1 works most efficiently when a ventilator V is completely covered by the ventilator cover 2 in the form of a substantially planar member 21. An extension 22 may be slidably and detachably mounted to the planar member 21 so that the receptacle 1 can be applied to a greater number of vehicle air conditioner ventilators regardless of size of the opening of the ventilator.

Figure 4:
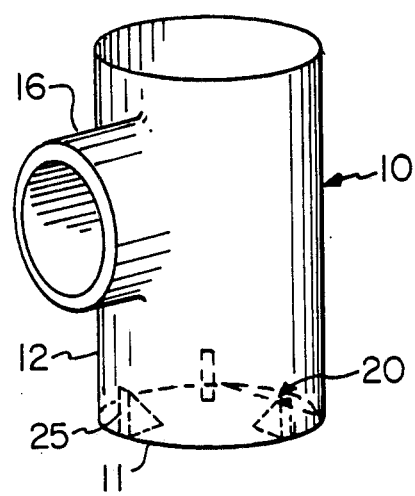
FIG. 4 is a perspective view of an alternative embodiment of the body of the receptacle.
Figure 5:
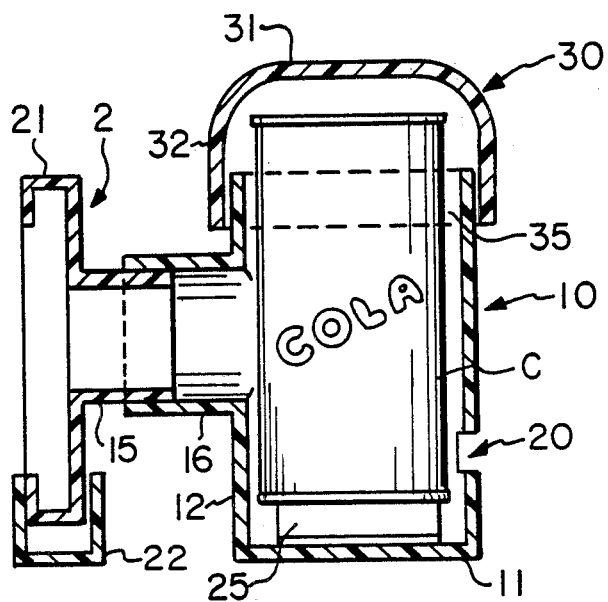
FIG. 5 is a section of FIG. 1 taken along lines V—V.

The receptacle of this invention may also include a plurality of container supports 25 (shown in dotted lines in FIG. 3 and FIG. 4). The supports 25 are preferably mounted on the base of the body 10. They may also be attached to the wall sections 12 near the base 11. The supports 25 allow the conditioned air entering the receptacle 1 to flow beneath a container C, such as a beverage can resting on the supports. The supports 25 may be curved about the perimeter of the base 11, as in FIG. 3, shaped as wedges, as in FIG. 4, or molded in a variety of other shapes. With the wedge-shaped configuration, containers placed in the receptacle 1 and resting upon the supports 25 tend to be centered in the chamber.

The lid 30 for the receptacle 1 includes a top portion 31 and a plurality of lid side sections 32. A principal function of the lid 30 is to protect the contents of the receptacle 1 from direct sunlight. The side sections 32 of the lid 30 are joined to the top portion 31 and to adjacent edges extended from the top portion 31. Alternatively, the lid 30 may be formed as a single piece. The side sections 32 of the lid 30 are sized and shaped to surround and overlap the wall sections 11 of the body 10 by a variable amount 35 when the lid 15 is placed on the body 10 to provide circulation of the conditioned air in the chamber. In the preferred embodiment, the side sections 32 are frictionally engaged with the wall sections 11 when the lid 30 is placed on the body 10.

The side sections 32 of the lid 30 may have a plurality of apertures, preferably in the form of slots 36. Each of said slots 36 defines a lid air exhaust hole 37 which varies in size depending upon the amount 35 the lid 30 overlaps the body 10. The exhaust holes 37 by their orientation direct air flow from the ventilator, through the receptacle and into the vehicle interior. For minimum flow of the conditioned air from the chamber, the lid exhaust holes 37 are minimized with the lid 30 overlapping the body 10 by a maximum amount 35. The side sections 32 of the lid 30 of the invention may have no slots, as in FIG. 1, a limited number of slots 36, as in FIG. 3, or slots entirely around the lid 30.

Figure 6:
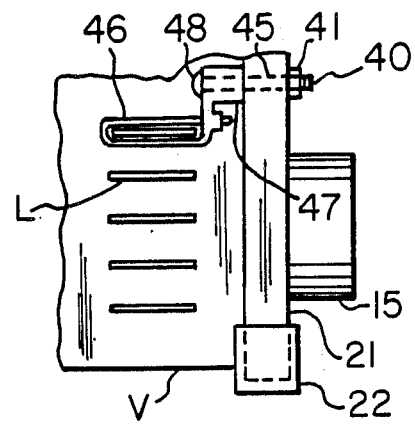
FIG. 6 is a side view of one means of mounting the ventilator cover to the louver of a ventilator.
Figure 7:
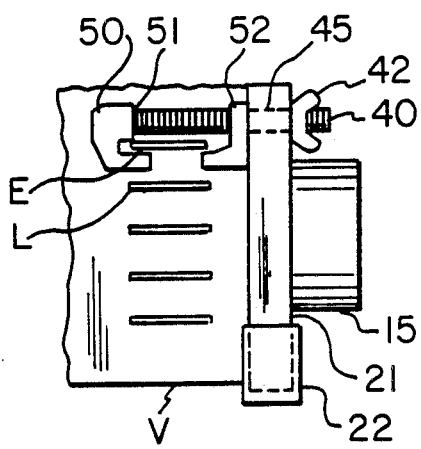
FIG. 7 is a side view of an alternative means for mounting the ventilator cover to the louver of a ventilator.
Figure 8:
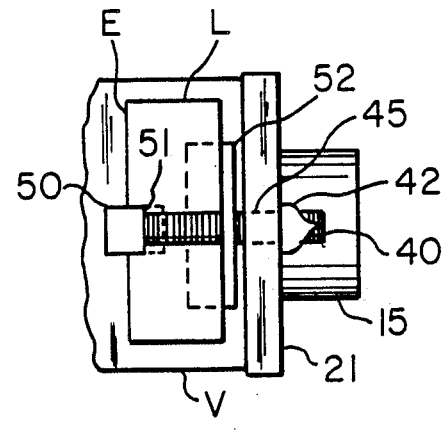
FIG. 8 is a top view of the ventilator cover and mounting means of FIG. 6.

The alternative means for mounting the ventilator cover 2 in the invention are shown in FIGS. 6–8. The ventilator cover 2 can be tied or clamped to a louver L of the ventilator V. In either means, at least one threaded mounting bolt 40 is extended through a mounting aperture 45 in the ventilator cover 2, then tightened in place with a nut 41, as in FIG. 6, wing nut 42, as in FIGS. 7 and 8, or any other suitable means.

The mounting means by tying, FIG. 6, further includes a tie strap and boss assembly. In mounting the cover 2 to a ventilator, the tie strap 46 of the tie strap boss 47 is wrapped to surround a particular louver L of the ventilator V. The mounting bolt 40 is extended through an aperture in the boss 47 before positioning through the aperture 45 in the ventilator cover 2. The nut 41 can then be tightened from outside the ventilator cover until the head 48 of the bolt 40 contacts snugly against the boss 47.

In FIG. 7 and FIG. 8, the mounting means by clamping the ventilator cover 2 to a louver L is shown in side and top views, respectively. The alternative mounting means further includes a J-shaped member 50 having an inwardly threaded end 51 for attachment to an end of the mounting bolt 40. Once threaded onto the bolt 40, the J-shaped member is inserted into the ventilator V and about the innermost edge E of the louver L. The other end of the bolt 40 is extended through an L-shaped clamping plate 52 and the mounting aperture 45 in the ventilator cover 2. The wing nut 42 can then be tightened to the bolt 40 for holding the ventilator cover 2 in place over the ventilator V.

The following examples of applications of this invention are not intended to limit the invention, but are by way of illustration.

EXAMPLE 1

The receptacle was mounted on a louver of a ventilator in the dashboard of a 1984 Mercury Marquis automobile. A beverage can was inserted into the receptacle and on the container supports. The temperature of the beverage within the can was measured at 68° F. A lid was placed on the receptacle, with the lid exhaust holes opened to a midway position. The engine to the automobile was started and the air conditioner was activated. The temperature of the air conditioner was set at its coldest position and the fan blower was turned to maximum. After ten minutes of driving, the temperature of the beverage within the beverage can measured 47° F. or 21° F. less than before cooling.

EXAMPLE 2

In this example, the same air conditioner in the 1984 Mercury Marquis was used at the same temperature and fan settings. However, in this example, a lid was not placed on the receptacle. The starting temperature of the beverage within the beverage can was 68° F. After ten minutes of driving, the temperature of the beverage within the can measured 48° F. or 20° F. less than before cooling.

EXAMPLE 3

In this example, the air conditioner of a 1984 Ford Mustang SVO was used and set at its coldest position with the fan blower set at maximum. Again, the lid overlapped the receptacle such that the lid exhaust holes were opened to a midway position. The original temperature of the beverage within a beverage can placed in the receptacle measured 75° F. After ten minutes of driving, the temperature of the beverage in the can was measured at 45° F. or 30° F. cooler.

Having presently described the preferred embodiments of this invention, it is to be understood that it may be otherwise embodied within the scope of the appended claims.

I claim:

1. A ventilator-mounted receptacle which comprises:
   a body including:
      a base; and
      a plurality of upstanding wall sections joined to said base and to adjacent edges of said wall sections in order to define a chamber which houses a container in an upright position; and
   means on the body for rigidly supporting said body directly adjacent a ventilator and for introducing conditioned air to said chamber, said means comprising a ventilator cover, a cover nozzle protruding from a surface of said ventilator cover, and a rigid receiver on one of said wall sections, said cover nozzle being adapted for connection to said receiver.

2. The receptacle of claim 1 wherein said receiver is in the form of a receiver nozzle, adapted for connection to said cover nozzle.

3. The receptacle of claim 1 wherein said body includes a conditioned air exhaust hole and said receptacle further comprises a lid including a top portion and a plurality of lid side sections joined to said top portion and to adjacent edges extending from said top portion, said side sections being sized and shaped to surround and overlap said wall sections of said body by a variable amount.

4. The receptacle of claim 3 wherein at least one of said side sections of said lid has a plurality of apertures, each of said apertures defining a lid air exhaust hole of a variable size depending upon the amount that said side sections overlap said wall sections when said lid is placed on said body.

5. The receptacle of claim 1 wherein said ventilator cover comprises:
   a substantially planar member; and
   an extension movably mounted on said planar member.

6. A ventilator-mounted receptacle which comprises:
   a body including:
      a base; and
      a plurality of upstanding wall sections joined to said base and to adjacent edges extending from said base in order to define a chamber which houses a container in an upright position,
   said body including a conditioned air exhaust hole and said receptacle further comprises a lid including a top portion and a plurality of lid side sections joined to said top portion and to adjacent edges extending from said top portion, said side sections being sized and shaped to surround and overlap said wall sections of said body by a variable amount, at least one of said side sections having a plurality of apertures, each of said apertures defining a lid air exhaust hole of a variable size depending upon the amount that said side sections overlap said wall sections when the lid is placed on the body;
   a ventilator cover;
   a cover nozzle protruding from a surface of said ventilator cover;
   a rigid receiver on one of said wall sections, said cover nozzle being adapted for connection to said receiver; and
   means for mounting said ventilator cover to a louver of an air conditioner ventilator.

7. The receptacle of claim 6 wherein said mounting means comprises:
   at least one mounting aperture extending through said ventilator cover;
   an elongated, L-shaped clamping plate;
   at least one threaded mounting bolt and nut; and
   a J-shaped member having an inwardly threaded end for attachment to an end of said mounting bolt.

* * * * *